Figure 1:
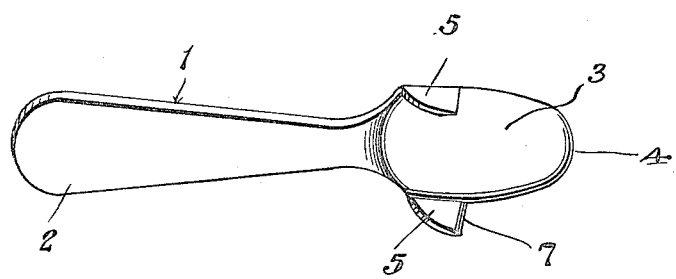

N. KOSIN.
ORANGE PEELER.
APPLICATION FILED DEC. 22, 1916.

1,231,913.  Patented July 3, 1917.

Witness
J. P. Mahler
Jesse T. Dowling

Inventor
N. Kosin.
By
Attorney

UNITED STATES PATENT OFFICE.

NATHAN KOSIN, OF DETROIT, MICHIGAN.

ORANGE-PEELER.

1,231,913.  Specification of Letters Patent.  Patented July 3, 1917.

Application filed December 22, 1916. Serial No. 138,392.

*To all whom it may concern:*

Be it known that I, NATHAN KOSIN, a citizen of the United States, residing at Detroit, in the county of Wayne and State of Michigan, have invented certain new and useful Improvements in Orange-Peelers; and I do hereby declare the following to be a full, clear, and exact description of the invention, such as will enable others skilled in the art to which it appertains to make and use the same.

This invention relates to improvements in orange peelers.

The object of this invention is to provide an orange peeler which will effectively strip an orange of its peeling without injuring the meat of the orange by cutting the body of the orange such as is now done by the use of knives or the like.

A still further object of this invention is to provide an orange peeler which is substantially spoon shaped and is provided with a pair of knives located on the longitudinal side edges of the bowl or head of the spoon adjacent the forward edge thereof and projecting rearwardly from the convex face this permitting the concave to follow the lines of the orange and thus the knives will have cutting engagement with the skin and quickly and readily removing the same therefrom.

A still further object of this invention is to provide an orange peeler of this character which will be simple, practical, and comparatively inexpensive in construction and one that can be manufactured and sold at a comparatively low cost.

With these and other objects in view, the invention consists in the novel combination and arrangement of parts, hereinafter more fully described and set forth in the claims hereto appended.

Figure 2:
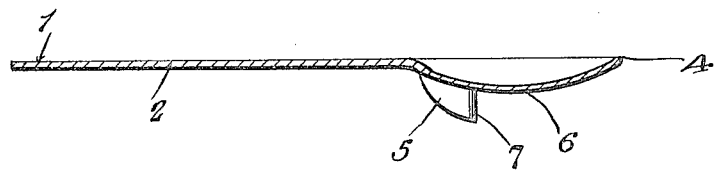
Figure 3:
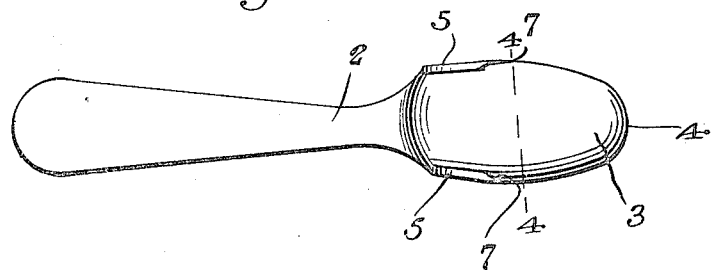
Figure 4:
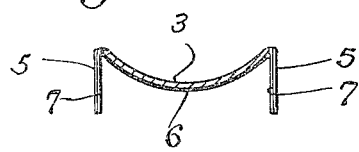

In the drawings:

Figure 1 is a perspective view illustrating my improved orange peeler made in accordance with this invention, Fig. 2 is a vertical sectional view of the same, Fig. 3 is a bottom plan view, Fig. 4 is a sectional view taken on the line 4—4 of Fig. 3.

Like numerals of reference designate corresponding parts in all the figures of the drawings.

Referring more particularly to the drawings, the numeral 1 designates my improved orange peeler which comprises in its construction, a handle 2 having the enlarged head 3, the head 3 is curved longitudinally and transversely to present concave and convex faces, the purpose of which will be hereinafter more fully described.

The forward edge of the head 3 is provided with a cutting edge 4, which permits the head to be inserted underneath the skin of an orange, and the concave face having an abutting engagement with the body of the orange.

Formed on the opposite longitudinal edges of the head 3 are a pair of diametrically opposed knives 5, which knives depend vertically from the longitudinal edges of the head 3 and extend below the convex face 6 of the head 3. The knives 3 have their inner faces tapered toward their forward edges to provide cutting edges 7 which are adapted to engage the skin and peel the same off in uniform slices.

In use, the cutting edge 4 of the head 3 is forced through the skin and the head 3 is forced along the body of the orange which is engaged by the concave face of the head 3 until the knives 5 are in contact with the skin of the orange thus and by further forcing the pressure upon the handle 2, the head 3 is forced along following the contour of the body of the orange and the cutting edges 7 of the knives 5 extend through the skin thus slicing the same in uniform slices and the orange can be readily and quickly peeled of its skin.

What is claimed is:

1. An orange peeler of the class described comprising a handle, a concavo-convex head at one end of the handle, said head being curved longitudinally and transversely and having a forward cutting edge, a pair of diametrically opposed knives arranged on the opposite longitudinal edges of said head, and depending vertically therefrom in the direction of the convex face.

2. An orange peeler formed of a single piece of material comprising an elongated handle, an enlarged head at one end of the handle, said head being curved longitudinally and transversely to provide concavo-convex faces, the forward edge of said head being provided with a cutting edge, a pair of cutting knives arranged on the opposite longitudinal side edges of the head at diametrically opposite points adjacent the point of connection of the head with the handle, said knives depending vertically from the rear side of the head and projecting beyond the convex face thereof, said knives having beveled inner faces providing cutting edges.

3. An orange peeler of the class described comprising an elongated handle, an enlarged head at one end of the handle, said head being curved transversely and longitudinally to provide a concave inner face and a convex outer face, the forward edge of said head provided with a cutting edge for insertion of the head into and through an orange skin, a pair of knives formed integrally with the opposite side longitudinal edges of the head at its point of juncture with the handle, said knives extending from the underside of the head and having beveled inner faces forming cutting edges, said knives projecting beyond the convex face of the head and adapted to slice the skin in uniform slices.

4. An orange peeler formed of a single piece of metal comprising an elongated handle, a head at one end of the handle, said head curved transversely and longitudinally to provide concavo-convex faces, the forward edge of said head provided with a cutting and insertion point to permit the head to be readily inserted through the skin of an orange and its concave face in abutting engagement with the body of the orange, a pair of diametrically opposed knives formed on the opposite side longitudinal edges of said handle and depending from the rear sides thereof at the point of juncture of the head with the handle, said knives having inner beveled faces terminating into sharp forward cutting edges and for the purpose specified.

In testimony whereof I affix my signature in presence of two witnesses.

NATHAN KOSIN.

Witnesses:
 LAWRENCE J. BERNSTEIN,
 E. SHOTZ.

Copies of this patent may be obtained for five cents each, by addressing the "Commissioner of Patents, Washington, D. C."